Dec. 28, 1965     C. VAN DER LELY     3,225,531
TEDDERS
Filed Aug. 24, 1964     6 Sheets-Sheet 4

Dec. 28, 1965   C. VAN DER LELY   3,225,531
TEDDERS
Filed Aug. 24, 1964   6 Sheets-Sheet 5

INVENTOR.
CORNELIS VAN DER LELY
BY
Mason, Mason & Albright
ATTORNEYS

Dec. 28, 1965  C. VAN DER LELY  3,225,531
TEDDERS
Filed Aug. 24, 1964  6 Sheets-Sheet 6

INVENTOR.
CORNELIS VAN DER LELY
BY
Mason, Mason & Albright
ATTORNEYS

3,225,531
TEDDERS
Cornelis van der Lely, Zug, Switzerland, assignor to Patent Concern N.V., Willemstad, Curacao, Netherlands Antilles, a limited-liability company of the Netherlands
Filed Aug. 24, 1964, Ser. No. 393,474
Claims priority, application Netherlands, Dec. 2, 1960, 258,676
26 Claims. (Cl. 56—372)

This invention relates to tedders of the kind comprising a frame movable over the ground and a tined body journalled in the frame so as to be rotatable about a substantially horizontal axis and is a continuation in part of my application Serial No. 155,553, filed November 29, 1961, now abandoned.

An object of the invention is the provision of a tedder which, in addition to producing a satisfactory tedding action, is capable of depositing tedded crop or the like on the ground in at least two relatively spaced swaths.

According to the invention, there is provided a tedder of the kind set forth, wherein the body is rotatable in a direction such that, during operation, the tines in a lowermost region of the body move forwardly relative to the direction of travel of the tedder, and wherein means are provided which, during operation, are arranged to guide crop or like material upwardly in front of the body and rearwardly over the body relative to the direction of travel of the tedder, further guide members being provided to divide such crop or like material into at least two parts which parts will be subsequently deposited on the ground in the form of a similar number of relatively spaced swaths.

For a better understanding of the invention, and to show how the same may be carried into effect, reference will now be made, by way of example, to the accompanying drawings, in which.

Figures 1, 7:
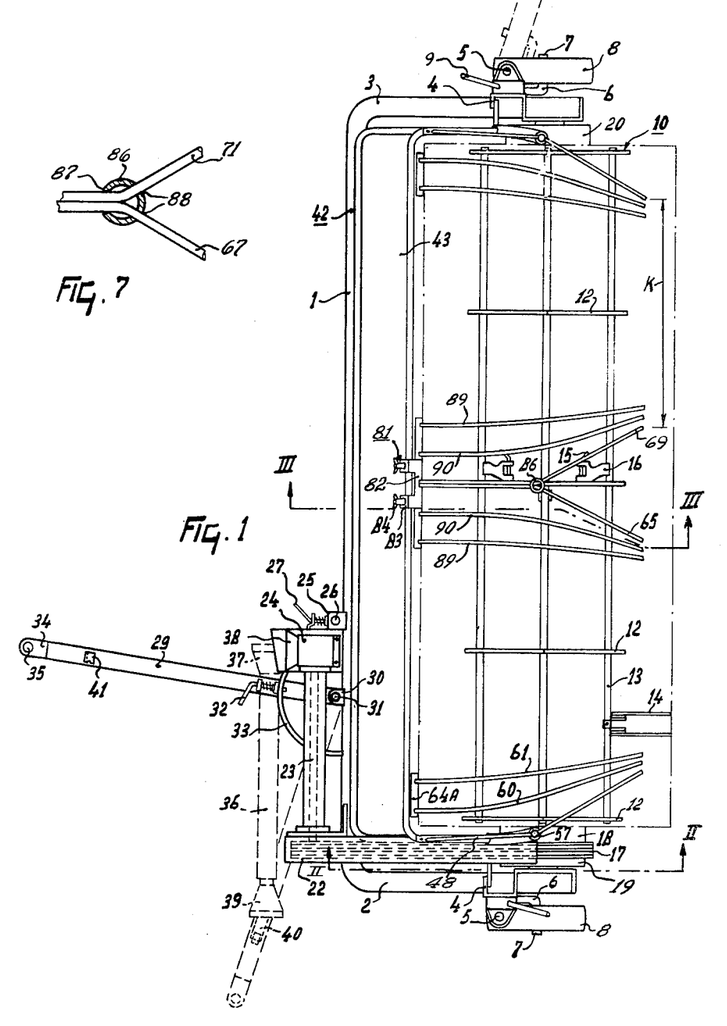
FIGURE 1 is a plan view of a tedder in accordance with the invention.
FIGURE 7 is a section, to an enlarged scale, taken on the line VII—VII of FIGURE 3.

The tedder shown in FIGURE 1 has a frame which includes a beam 1 extending transverse to the intended direction of travel and two beams 2 and 3 which are integrally secured to opposite ends of the beam 1 in such a way that they extend parallel to one another and perpendicular to the beam 1. Supports 4 are secured to the two beams 2 and 3 at locations close to the free ends thereof, the supports 4 affording substantially vertical bearings in which substantially vertical shafts 5 are rotatably journalled. Each of the shafts 5 is integral with an inclined connecting rod 6 at the lower end of which a horizontal axle 7 is formed. A ground wheel 8 is rotatably mounted on each of the two axles 7, the ground wheels 8 being caster wheels by virtue of the fact that the longitudinal axes of the shafts 5 do not intersect the longitudinal axes of the axles 7. The supports 4 include means (not shown) by which the level of the axles 7 relative to the frame can be adjusted. The axles 7 are raised or lowered relative to the frame by turning cranks 9 mounted at the upper ends of screw-threaded rods in appropriate directions. Means (not shown) is also provided to enable the plane of rotation of at least one of the ground wheels 8 to be retained in a desired setting relative to the frame.

A cylindrical body, generally indicated by the reference numeral 10, is rotatably journalled in the frame and comprises a central shaft 11, affording the axis of rotation, to which shaft five square plates 12 are secured. Four support beams 13 are journalled in holes formed adjacent the four corners of each of the plates 12, the beams 13 extending parallel to the shaft 11 and carrying tines 14 of which only one pair is illustrated in FIGURE 1. Each of the beams 13 is turnable about its own longitudinal axis and is so arranged that it can be retained in any one of a number of different angular settings. To this end, each of the beams 13 carries a forked bracket 16 the limbs of which carry a spring-loaded horizontal locking pin 15. The tip of each locking pin 15 can be entered in any one of a number of holes (not shown) formed in the central one of the five plates 12. It will be evident that the corresponding beam 13 and the tines 14 which are secured thereto will be retained in an angular setting corresponding to the hole chosen to receive the tip of the locking pin 15.

A pulley 17 is rigidly secured to one end of the shaft 11 and a screening rim 18, secured to the same end of the body 10 projects into the cylindrical interior of the pulley 17. On the side of the pulley 17 remote from the body 10, the pulley has a cylindrical extension 19 in which a screening plate (not shown) fastened to the frame of the tedder is disposed. At the end of the body 10 remote from the pulley 17, a cylindrical rim 20 is mounted within which a further screening plate (not shown) fastened to the frame of the tedder is disposed. The pulley 17 is linked by means of two V-section belts or ropes 21 to a further pulley mounted inside a protective casing 22. The latter pulley is secured to one end of a shaft which extends parallel to the frame beam 1 within a cylindrical casing 23. The opposite end of the shaft is connected to the output shaft of a gear transmission 24.

A vertical slideway 25 is secured to the leading side of the frame beam 1 and a vertical rod 26 is slidable therein. The tip of a spring-loaded locking pin 27 projects through a hole in the side of the bore of the slideway 25 and can enter any one of a number of holes, grooves or the like formed in the rod 26 at different levels. The lowermost end of the rod 26 carries a plate which is adapted to form a third support point, in conjunction with the two ground wheels 8, at times when the tedder is not coupled to a vehicle. The rod 26 is formed with a groove, hole or the like in such a position that, when the tip of the locking pin 27 is entered therein, the plate is located at a level well clear of the surface of the ground. This setting of the rod 26 is employed when the tedder is in use.

A forked bracket 30 is secured to the same side of the frame beam 1 as the slideway 25 and carries a substantially vertical pivot pin 31 about which a drawbar 29 is turnable. A spring-loaded horizontal locking pin 32 is mounted on the upper side of the drawbar 29 with the aid of two relatively spaced lugs, the tip of the locking pin 32 being urged into engagement with one side of a semi-cylindrical strip 33 which is also secured to the frame beam 1 and whose center of curvature is afforded by the pivot pin 31. The strip 33 is formed with a number of holes in any one of which the tip of the locking pin 32 can be entered to retain the drawbar 29 in a corresponding angular setting about the pivot pin 31. The free end of the drawbar 29 is provided with a fork 34 having a pair of vertically aligned holes 35 adapted to cooperate with a tow bar or the like to connect the tedder to a vehicle, such as a tractor.

The input shaft (not shown) of the gear transmission 24 is substantially horizontally disposed and extends in a hood 38 secured to the casing of the transmission 24. The said input shaft is connected to an intermediate shaft by way of a universal joint which is located in the hood 38 and a further hood 37. The intermediate shaft extends within a cylindrical casing 36 at the opposite end of which a further hood 39 is disposed. Within the hood 39, one end of the intermediate shaft is connected to a coupling 40 by way of a further universal joint. The parts 36, 37, 39 and 40 are shown in broken lines in FIGURE 1 in a position in which they are suitably disposed for transport of the tedder. The coupling 40 is afforded by an internally splined sleeve adapted to cooperate with the corresponding external splines provided on the power take-off shafts of tractors and like vehicles.

During operation of the tedder, the casing 36, together with the hoods 37 and 39 are turned about a shaft of the universal joint which extends substantially vertical in the transport position into a position in which the casing 36 projects forwardly of the tedder. The coupling 40 can then be connected to the power take-off shaft of the tractor or like vehicle which is to draw the tedder over the ground. The upper side of the drawbar 29 carries a bracket 41 having a vertical limb and a horizontal limb. The arrangement is such that, when the drawbar 29 is turned about the pivot pin 31 into a position in which it is suitably disposed for transport of the tedder, this position being shown in broken lines in FIGURE 1, the casing 36 can be moved to a position in which the coupling 40 will cooperate with the bracket 41 to retain said coupling together with its associated parts in a fixed position relative to the drawbar 29. It will be apparent that this position is arrived at by turning the drawbar 29 to an intermediate position in which the coupling 40 and bracket 41 are just in register whereafter, upon turning the drawbar 29 further about the pivot pin 31 to the position shown in broken lines in the drawing, the coupling 40 will be urged into engagement with the horizontal limb of the bracket 41. The horizontal limb of the bracket 41 is preferably so shaped that it slides into engagement with a relatively opposite pair of the internal splines formed within the coupling 40. A hole is, of course, formed in the strip 33 for cooperation with the locking pin 32 in the position of the drawbar 29 shown in broken lines.

As can be seen in FIGURE 1, the free end of the drawbar 29 projects to one side of the tedder when the drawbar is suitably disposed for transport of the tedder. The plane of rotation of the ground wheel 8 farthest from the drawbar 29 is preferably retained in the angular setting shown in broken lines in FIGURE 1 whereas the other ground wheel 8 is left as a free caster wheel. During transport, the disposition of the tedder is such that it lies mainly within the path of travel of the tractor or other vehicle which is towing it. The inclination of the drawbar 29 to the frame beam 1 is approximately 20° at such times.

First guide means, in the form of a hood-shaped screening baffle 42 is disposed in front of the body 10 relative to the intended direction of travel and is comprised by a curved plate 43 whose center of curvature coincides with the shaft 11 and by two side plates 44 which lie in planes that are perpendicular to the shaft 11. In order to strengthen the baffle 43, tubes 45 and 46 are secured thereto and extend along the edges of the plates 43 and 44. The lower edge of the plate 43 is disposed at approximately the same level as the shaft 11 and the whole of the plate 43 subtends an angle of about 45° at the said shaft.

Second guide means is comprised of resilient rods which are attached to the tedder.

Figures 2, 6:
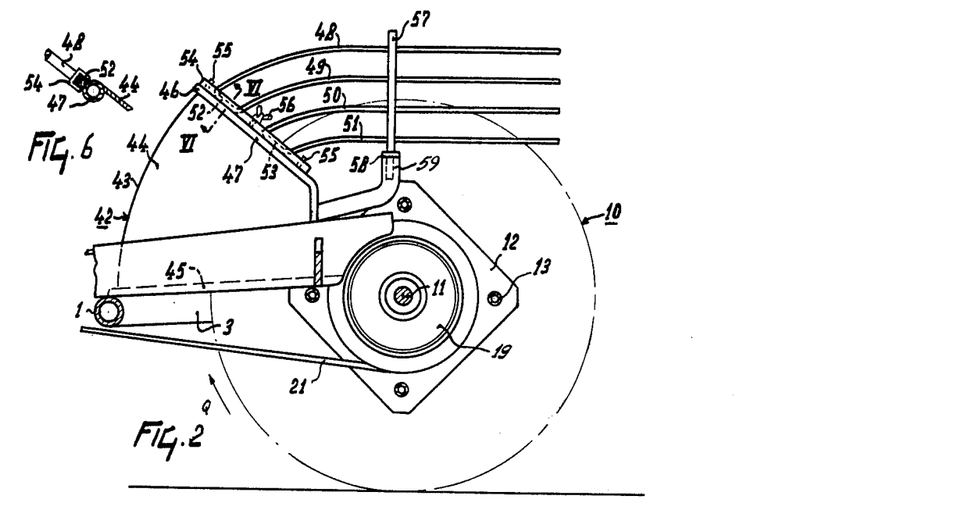
FIGURE 2 is a section, to an enlarged scale, taken on the line II—II of FIGURE 1.
FIGURE 6 is a section, to an enlarged scale, taken on the line VI—VI of FIGURE 2.

The baffle 42 carries four guide rod elements 48, 49, 50 and 51. These rods are secured to a part 47 of the tube 46, which part extends along the upper edge of one of the plates 44. The rods 48 and 49 are made from a single length of spring steel and are integrally connected by a portion 52 which lies against the tube 47 and the rods 50 and 51 which are formed in the same way are integrally connected by a similarly disposed portion 53. The portions 52 and 53 are secured in position against the part 47 of the tube 46 by a channel-shaped bar 54. The guides 48, 49, 50 and 51 project through holes in the web of the bar 54 while the portions 52 and 53 lie within the channel of the bar 54 which channel is closed by the abutting side of the part 47 (FIGURE 6). The bar 54 is clamped to the part 47 by means of a stud which projects from the part 47 and is entered through a hole in the web of the bar 54, a wing nut 56 being screwed onto the projecting end of the said stud. In addition, two locating pins 55 project from opposite ends of the part 47 and are entered through registering holes in the web of the bar 54.

The guides 48, 49, 50, and 51 are supported at a distance from the part 47 by means of a vertical bar 57 which, in plan view, is located immediately in front of the shaft 11 considered in the intended direction of travel. A collar 58 is secured to the bar 57 towards its lower end and the part of the bar which projects below the said collar is entered in the mouth of a tubular support 59 which is secured to the frame of the tedder. The guides 48 to 51 are entered through corresponding transverse holes formed in the bar 57, the parts of the said guides which lie between the baffle 42 and the bar 57 being curved in such a way that the point at which each of them is secured to said baffle is disposed at a lower level than the corresponding transverse hole in the bar 57. The free ends of the guides 48 to 51 project beyond the bar 57 and each of them is located in a substantially horizontal plane. However, when seen in plan view, that part of each guide which projects beyond the bar 57 is inclined relative to the remainder thereof. The inclination is such that, in plan view, an angle of approximately 60° is enclosed between the straight free end of each guide and the shaft 11.

At a short distance from the guides 48 to 51, further guides 60 and 61 are provided. The ends of these guides are clamped to a lug 63 (FIGURE 5) projecting from the frame beam 1 by means of a bolt 62. The same bolt 62 acts to secure a lug 64 to the lug 63, the lug 64 projecting from the tube 45 which is provided around the lowermost edges of the plates 43 and 44. Thus, the baffle 42 is secured to the frame beam 1.

The guides 60 and 61 extend along the concave face of the plate 43 and are entered through holes formed in a support plate 64A secured to the tube 46. The projecting ends of the guides 60 and 61 are bent over slightly, as seen in plan view, in the same direction as the guide 48 but the bending is less pronounced so that, in plan view, the extreme free ends of the guides 48, 60 and 61 lie close to one another. Moreover, the part of the guides 60 and 61 which project beyond the support plates 64A are contained in substantially the same plane as the part of the guide 48 which projects beyond the bar 57. As can be seen in FIGURE 1, guides which are symmetrical with the guides 48, 49, 50, 51, 60 and 61 are provided at the opposite end of the body 10. The construction and function of these guides and their associated parts is identical with that of the guides just described so that no separate description of them is necessary.

At a location approximately midway between the opposite ends of the body 10, eight guide rods 65, 66, 67, 68, 69, 70, 71 and 72 (FIGURE 3) are secured to the baffle 42. When viewed in a direction parallel to the shaft 11, the guides are located in pairs one behind the other, there being four pairs of guides disposed one above the other. It will thus be understood that only the four rods designated by reference numerals 65, 66, 67 and 68 can be seen in FIGURE 3, with rods 69, 70, 71 and 72, respectively, disposed behind them. Each pair of guides is made integrally from a single length of spring steel, the guides in each pair being interconnected by a curved portion 73 (see FIGURE 4). The four curved portions 73 engage around a pin 74 between two stop plates 75 which are spaced apart along the pin 74 and whose edges abut against the frame beam 1.

Figure 3:
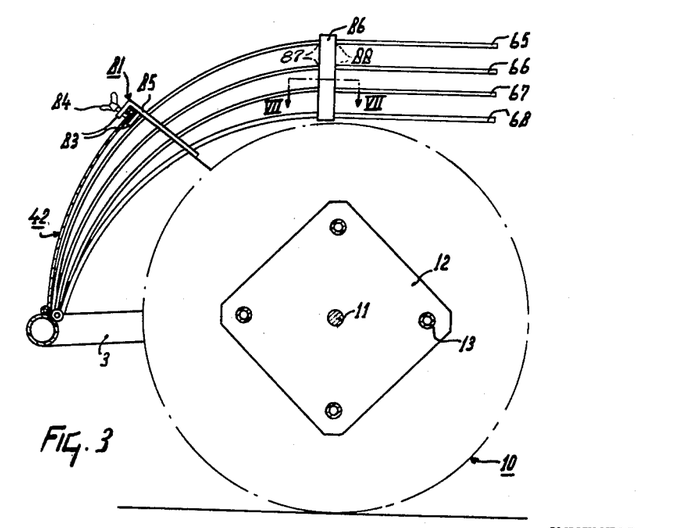
FIGURE 3 is a section, to an enlarged scale, taken on the line III—III of FIGURE 1.

One end of the pin 74 is located in a blind hole formed in a lug 76 secured to the frame beam 1 while the other end of the pin is formed with a blind longitudinal bore in which the tip of a locking pin 7 is engaged. The locking pin 77 is passed through aligned holes formed in two lugs 78 projecting from the frame beam 1 and is loaded by means of a coiled compression spring 80 bearing between one of the lugs 78 and a collar 79 secured to the said pin into engagement with the end of the pin 74 having the blind bore. The guides 65 to 72 extend rearwardly from the frame beam 1 beneath the concave side of the plate 43 and, as can be seen in FIGURE 3, their free ends are located at different levels. The guide rods 68 to 72 together constitute a dividing member which separates the space beneath the baffle 42 into two parts. A support 81 is secured to the upper edge of the baffle 42 and comprises a strip 82 extending parallel to the tube 46 and two pairs of lugs 83, the lugs in each pair projecting beyond the tube 46 on opposite sides thereof. The lugs 83 which lie above the tube 46 are formed with screw-threaded holes which receive bolts 84 by means of which the support 81 is secured in place relative to the baffle 42. The strip 82 also has a downwardly inclined part 85 (FIGURE 3) formed with holes through which the various guides 65 to 72 are entered. The parts of the said guides which project beyond the support 81 curve upwardly in planes perpendicular to the shaft 11 until they reach a vertically disposed tube 86. The tube 86 is formed with four entry holes 87, each corresponding to a pair of the guides 65 to 72 located at the same level and also with eight exit holes 88 from which the free ends of the said guides project. Each of the guides is bent within the tube 86 so that the projecting free ends of each pair diverge relative to one another. It will thus be apparent that the holes 87 and 88 in the tube 86 are not in diametric alignment with one another. The arrangement is such that, as can be seen in FIGURE 1, in respect of the guides 65 and 69, the divergent free ends are inclined to one another at an angle of about 60°. Each free end is also inclined, in plan view, at an angle of about 60° to the shaft 11.

On either side of the guides 65 to 72, guides 89 and 90 are provided, the arrangement and mounting of these guides being substantially identical to the arrangement and mounting of the guides 60 and 61 previously described. It can be seen from the drawings that all the guides located close to the middle of the body 10 are spaced apart from the shaft 11 by a greater distance than the tips of the tines 14. However, as can be seen in FIGURE 2, parts of the guides 50 and 51 of the groups located at the opposite ends of the body 10 are disposed closer to the shaft 11 than are the tips of the tines 14.

During operation of the tedder, the body 10 is rotated about the axis of the shaft 11 in the direction indicated by the arrow Q in FIGURE 2 so that the tines 14 in a lowermost region of the body 10 move forwardly over the ground relative to the direction of travel of the tedder. Thus, crop or like material is moved forwardly and upwardly by the tines 14 and comes into engagement with the baffle 42 which constitutes means for guiding the said crop or the like upwardly and rearwardly over the body 10. The crop or like material then comes into contact with the various guide rods which have been described and, due to their shape and arrangement, is divided into two relatively spaced parts. The crop or like material then falls to the ground in the form of a similar number of relatively spaced swaths.

The arrangement is, in fact, such that the space K (FIGURE 1) which is formed from the ejection of crop or like material is very slightly greater in width than one quarter of the length of the body 10.

In a conventional tedder, the crop or the like displaced by the body 10 is deposited on a strip of land whose width is approximately equal to that of the body 10. However, in this case, the crop or like material is deposited in two relatively spaced swaths the widths of which are determined by the distances K between the groups of guides at the opposite ends and center of the body 10. Obviously, therefore, the crop or like material is deposited on a strip of land whose total width is substantially smaller than the width of the body 10.

The guides 60 and 61 disposed at the opposite ends of the body 10 and the guides 89 and 90 disposed close to the center thereof constitute, in effect, prolongations of the curved plate 43 of the baffle 42 so that these guides act to prevent the crop or the like from being thrown upwardly out of the range of the other guides. As has been previously stated, the distances K between the various groups of guides are very approximately equal to one quarter of the width of the body 10 but, since the guide rods are made of spring steel, they can deflect readily to alter the distances K temporarily so that any risk of crop or the like becoming jammed between, for example, the guides and the body 10 is very slight.

The guides 48 to 51 can be readily removed from the tedder merely by unscrewing the wing nut 56 and removing the bar 54 from the locating pins 55 and also the bar 57 from the support 59. The guides at the center of the body 10 can also be readily removed by loosening the bolts 84 and by withdrawing the locking pin 77 in the direction indicated by the arrow R in FIGURE 4. After the withdrawal of the locking pin 77, the pin 74 can itself be removed which allows all the guides to be withdrawn together. When all the various guides have been removed, the implement can be used in the conventional manner previously mentioned in which the displaced crop is spread over a strip of land whose width is substantially the same as the width of the body 10.

Figures 4, 5, 8, 9, 11:
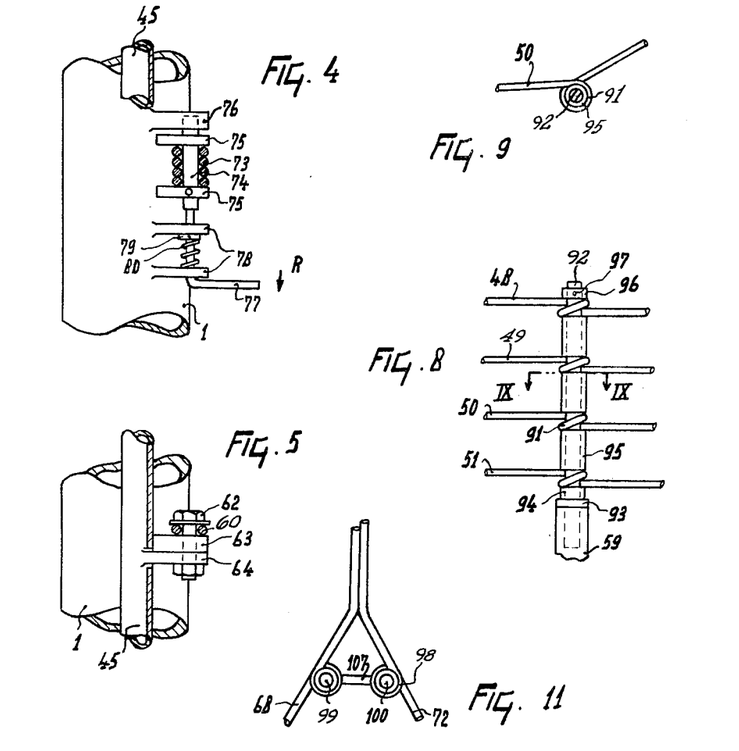
FIGURE 4 is a plan view showing part of the implement of FIGURES 1 to 3 in greater detail.
FIGURE 5 is a view similar to FIGURE 4 showing a further part of the implement in greater detail.
FIGURE 8 shows an alternative arrangement of part of the implement.
FIGURE 9 is a section taken on the line IX—IX of FIGURE 8.
FIGURE 11 is a section taken on the line XI—XI of FIGURE 10.

FIGURES 8 and 9 show an alternative arrangement for connecting the guide rods 48 to 51 to the frame at the opposite ends of the baffle 42. In this arrangement, each rod has a helical loop 91 of slightly less than 360°, the loops being located on the sides of the guides remote from the body 10. A vertical pin 92 having a collar 93 towards its lower end is entered in the hollow end of the tubular support 59 instead of the bar 57 previously described. A spacing sleeve 94 is disposed around the pin 92 immediately above the collar 93 and the loop 91 of the guide 51 is disposed immediately above this. Three further longer spacing sleeves 95 are disposed between the loops 91 of the other guides and a small sleeve 96 is disposed above the loop 91 of the topmost guide 48. The sleeve 96 is secured to the pin 92 by means of a small transverse pin 97. The outer diameter of the sleeves 94 to 96 is preferably smaller than the outer diameter of the loops 91 of the various guides. This prevents protuberances being formed at the sides of the various guides which might tend to interfere with the free passage of the crop past the guides.

Figure 10:
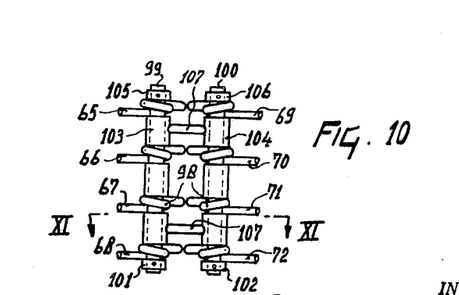
FIGURE 10 is a view of a further alternative arrangement of part of the implement.

FIGURES 10 and 11 show an alternative arrangement for the interconnection of the guides 65 to 72 disposed at the middle of the body 10. At a short distance from the location at which the various guides commence to diverge relative to one another, each guide is provided with a helical loop 98 of approximately 360°. The loops 98 are disposed on the sides of the various guides remote from the sides which normally engage the crop or like material. A pin 99 is taken through the loops 98 of the four guides 65 to 68 which are disposed one above the other and a similar pin 100 is taken through the loops 98 of the guides 69 to 72 which are also disposed one above the other. The loops 98 of the lowermost guides 68 and 72 bear against sleeves 101 and 102 secured to the lowermost ends of the pins 99 and 100 with the aid of small transverse pins. Further larger spacing sleeves 103 and 104 are disposed between the loops 98 of the various guides around each of the respective pins 99 and 100. The loops 98 of the topmost guides 65 and 69 bear against two small sleeves 105 and 106 which are secured to the pins 99 and 100 in the same manner as the sleeves 101 and 102.

As can be seen in the drawings, certain of the sleeves 103 and 104 are joined to each other by connecting pieces 107.

FIGURES 12 to 16 show part of a tedder which is generally similar to that already described but in which the various guide means are differently constituted. A group 108 (FIGURE 12) of guide rods is disposed at each end of the baffle 42, the guides in each group being bent inwardly towards the center of the body 10. At the center of the body 10, on the other hand, two groups 109 and 110 of guide rods are mounted, the guides in each being bent oppositely towards the two ends of the body 10. Since the guide rods of all the groups 108, 109 and 110 are similarly mounted, it will be sufficient to describe only the mounting of the rods of the group 109 in detail.

Figures 12, 13, 14, 15, 16:
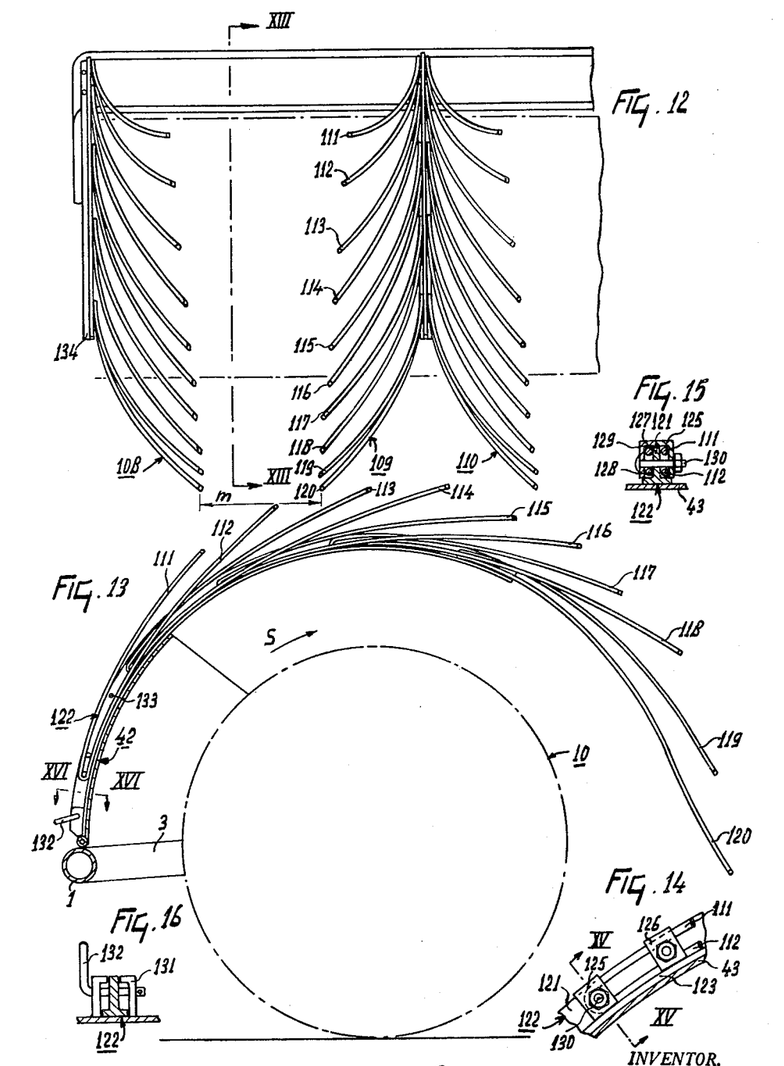
FIGURE 12 is a plan view of part of an alternative embodiment of a tedder in accordance with the invention.
FIGURE 13 is a section, to an enlarged scale, taken on the line XIII—XIII of FIGURE 12.
FIGURE 14 is a view showing part of the tedder of FIGURES 12 and 13 in greater detail.
FIGURE 15 is a section taken on the line XV—XV of FIGURE 14.
FIGURE 16 is a section, to an enlarged scale, taken on the line XVI—XVI of FIGURE 13.
Figure 17:
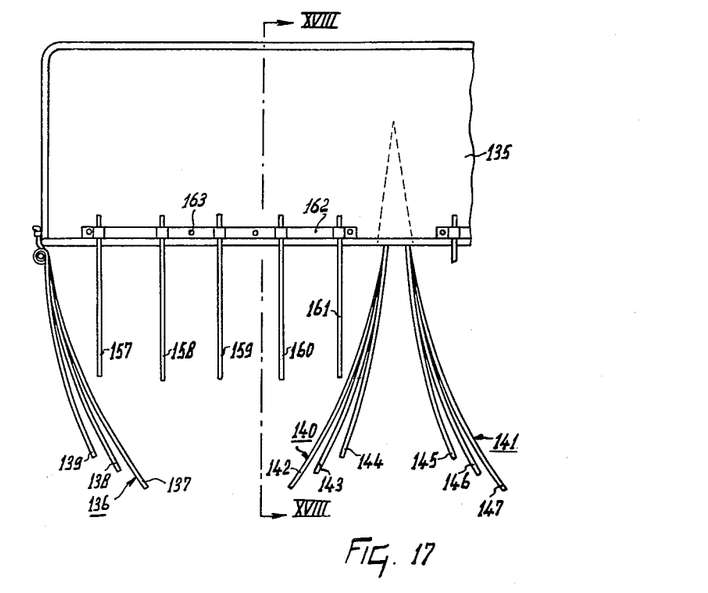
FIGURE 17 is a plan view of part of a further alternative embodiment of a tedder in accordance with the invention.

The groups 109 is comprised by ten guides 111 to 120 the guides being formed in five integral pairs 111, 112 and so on. Each integral pair of guides has a shape somewhat similar to a hairpin and is formed from spring steel. Each pair of guides, such as the guides 111, 112 shown in FIGURES 14 and 15, is secured to one side of the upright 121 of an inverted T-shaped (in cross section) beam 122 to the opposite side of which upright two guides 128 and 129 of the group 110 are symmetrically secured. The beam 122 is curved and has its lowermost end secured to the baffle 42. The crossbar 123 of the beam 122 abuts against the convex side of the curved plate 43 and the whole beam subtends an angle of about 130° at the shaft 11 affording the axis of rotation of the body 10. Thus, obviously, the beam 122 projects upwardly beyond the upper edge of the baffle 42 since the latter, as in the previous embodiment, subtends only an angle of about 45° at the said shaft 11.

Referring again to FIGURES 14 and 15, it will be seen that the guides 111 and 127 abut against the opposite sides of the top end of the upright 121 whereas the guides 112 and 128 abut against the opposite sides of the bottom end thereof. The guides are retained in position by means of right-angled clamping plates of which two similar plates 125 and 126 can be seen in FIGURE 14, and a pair of symmetrical clamping plates 125 and 129 can be seen in FIGURE 15. Each pair of clamping plates, such as the pair 125 and 129, form an inverted channel which is bisected by the upright 121 of the beam 122. Each pair of clamping plates is secured to the upright 121 by means of a bolt 130.

The beam 122 is releasably secured to the baffle 42 at two different locations. At its lowermost end, it is entered between two symmetrical L-shaped lugs 131 rigidly secured to the plate 43 and is fastened to these lugs by means of a locking pin 132 (FIGURE 16) which is entered through aligned holes in the lugs and a registering hole in the upright 121 of the beam 122. At a location towards the upper edge of the plate 43 of the baffle 42, two further lugs (not shown) similar to the lugs 131 are provided and the beam 122 is connected to these lugs in a manner similar to that just described by means of a locking pin 133 (FIGURE 13). When viewed in a direction parallel to the axis of rotation of the body 10 (see FIGURE 13) the guides 111 to 120 are very slightly curved and each of them extends approximately tangentially relative to a circle whose center lies upon the axis of rotation of the body 10. The guides are arranged in overlapping relationship and, considered in the intended direction of travel of the tedder, the topmost guides 113 and 114 of the group 109 are located in front of the lowermost guides 119 and 120. The guides are also curved when seen in plan view (FIGURE 12) each guide being bent in such a way that its free end tends to extend parallel to the axis of rotation of the body 10. The tips of all the guides of each group are contained in a vertical plane which is substantially perpendicular to the axis of rotation of the body 10.

As can be seen in FIGURE 13, the extreme ends of the rearmost guides 119 and 120 are very slightly curved in a direction opposite to the curvature of the remaining parts of the same guides, the centers of curvature of these ends being located well above the guides. Moreover, the rearmost guides have a substantially greater length than the foremost guides considered in the intended direction of travel of the tedder. In fact, the guides together subtend an angle of approximately 140° at the axis of rotation of the body 10 and the tip of the guide 120 is preferably located at a distance of between 20 and 30 cms. above the surface of the ground.

The guides of the group 108 are secured to the upright of an L-shaped curved beam 134 which beam abuts against, and is secured to, the plates 43 of the baffle 42 in a manner similar to that described in connection with the beam 122.

During operation of the tedder, the body 10 is rotated in the direction indicated by the arrow S in FIGURE 13 so that displaced crop or the like is moved forwardly relative to the direction of travel of the tedder and is guided upwardly and rearwardly over the body 10 by the baffle 42. When the crop or the like leaves the baffle 42, that part of it which is within range of the various rods slides along these rods towards the tips thereof. The crop or the like will, once again, be deposited upon the ground in two relatively spaced swaths whose total width is considerably less than the width of the body 10. The width of each swath is determined by the distance $m$ (FIGURE 12) between the rearmost guides of opposing groups of guides. It will be clear that the actual moment at which the crop or the like leaves the guides and falls to the ground will depend upon several factors such as the speed of rotation of the body 10 and the speed of travel of the tedder over the ground. However, in any case, the crop or the like will tend to fall to the ground by the time it reaches the rearmost guide of each group. The distance *m* is, in the embodiment illustrated, slightly smaller than one sixth of the total width of the body 10. As in the previous case, the flexibility of the guides offsets the tendency for crop or the like to became jammed between, for example, the guides and the tines of the body 10. It will be noted that the fact that the guides are all secured to the convex side of the baffle 42 allows the concave side thereof to be entirely smooth and unbroken.

FIGURES 17 to 20 show a third embodiment of part of a tedder in accordance with the invention. Once again, the tedder is basically similar to the tedder illustrated in FIGURE 1. The circle 134A shown in FIGURE 18 denotes the path of the tips of the tines 14 when the body 10 is rotating in the direction indicated by the arrow V. In this embodiment, a baffle 135 is provided which is similar to the baffle 42 previously described but which subtends an angle of approximately 90° at the axis of rotation of the body 10. That is to say, the uppermost edge of the baffle 135 lies in a substantially vertical plane which also includes the said axis of rotation. At the opposite ends of the body 10, two groups of guides 136 are provided, only one of these groups being visible in FIGURE 17. The group is comprised by three guide rods 137, 138 and 139 which guides extend, in plan view, both rearwardly relative to the intended direction of travel of the tedder and inwardly towards the center of the body 10 from the points at which they are secured to the baffle 135. Two groups 140 and 141 of guide rods are secured to the baffle 135 in the region of the center of the body 10, the groups being symmetrically arranged and each including three guide rods 142, 143, 144 and 145, 146, 147, respectively. When seen in plain view (FIGURE 17), the guides of the two groups 140 and 141 extend either similarly or symmetrically relative to the guides of the group 136. The groups are, in fact, symmetrically arranged relative to a plane perpendicular to the axis of rotation of the body 10 and located midway between the two groups 140 and 141.

Figure 19:
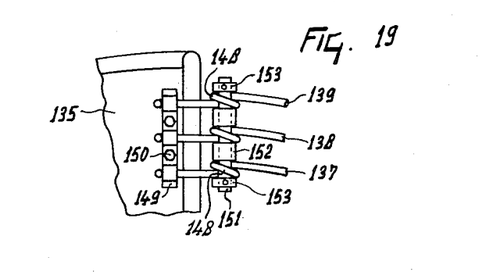
FIGURE 19 is a view showing part of the tedder of FIGURES 17 and 18 in greater detail.

The fastening of the guides of the group 136 to the baffle 135 is illustrated in detail in FIGURE 19 from which it can be seen that each of the guides 137 to 139 is formed with an approximately 360° helical loop 148 close to its anchored end. Each of the loops 148 is disposed on that side of the corresponding guide which is remote from the corresponding body 10. The ends of the guides 137 to 139 are secured to one of the side plates of the baffle 135 by means of a clamping strip 149 and two bolts 150. The extreme free ends of the guides are turned over to prevent their disengagement from the clamping strip 149. A substantially vertical pin 151 is entered through the three loops 148, short sleeves 153 being secured to the uppermost and lowermost ends of the pin 151 by means of small transverse pins. Two longer spacing sleeves 152 are disposed around the pin 151 between the loops 148 of the three guides 137 to 139. The two groups 136 at the opposite ends of the body 10 constitute, in effect, prolongations of the side plates of the baffle 135.

Figure 18:
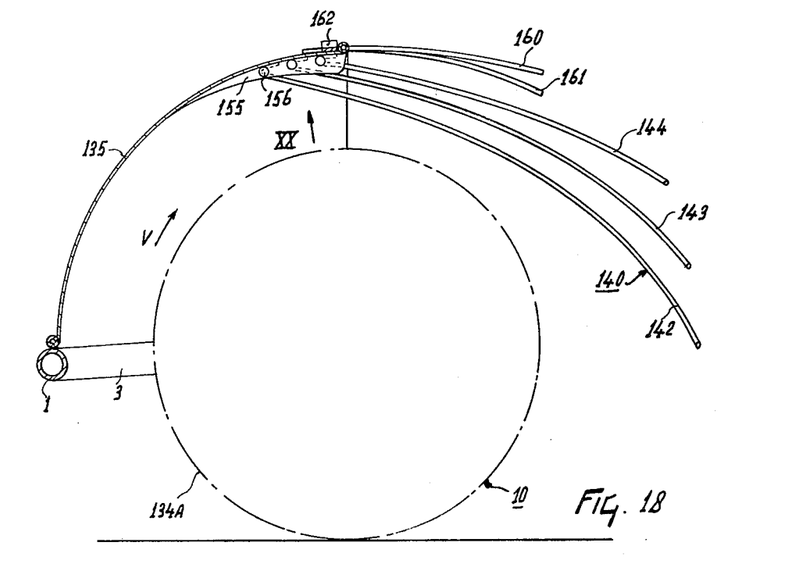
FIGURE 18 is a section, to an enlarged scale, taken on the line XVIII—XVIII of FIGURE 17.
Figure 20:
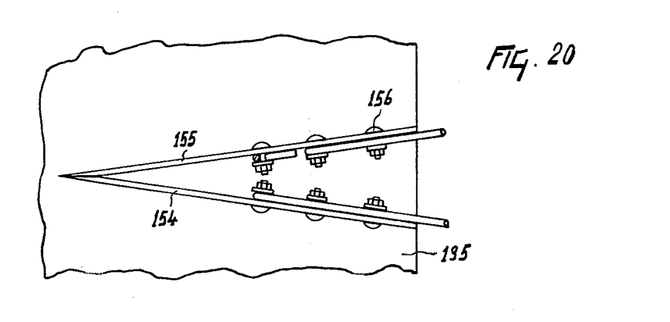
FIGURE 20 is a view taken in the direction indicated by the arrow XX of FIGURE 18.

Two plates 154 and 155 (FIGURES 18 and 20) are secured to the concave side of the baffle 135 towards the uppermost edge thereof, the plates together forming a wedge-shaped dividing member by virtue of the relative inclination of the plates 154 and 155. The guides of the two groups 140 and 141 are respectively secured to the relatively facing sides of the two plates 154 and 155. As can be seen in FIGURES 18 and 20, the anchored end of each guide is bent through nearly 180° and is clamped to the corresponding plate by means of a bolt 156.

When seen in a direction parallel to the axis of rotation of the body 10, (FIGURE 18) the guides of each group are located one above the other, the topmost guide being the shortest and the lowermost guide the longest. It will be apparent from what has been previously stated that the guides of all the groups are spaced vertically in a similar manner to the guides of the group 140 which can be seen in FIGURE 18. Each guide of each group is bent downwardly from its fastening point, the lowermost guide in each group having a shorter radius of curvature than the guides above it. The guides of two groups, such as the groups 136 and 140, are contained in two imaginary curved surfaces which would intersect along a line located rearwardly of the tedder. The said line curves forwardly towards the tedder as it approaches the ground. The two imaginary curved surfaces extend, in fact, in wedge-shaped relationship.

Five guide rods 157 to 161 are secured to the uppermost edge of the baffle 135 between the groups 136 and 140, a similar number of guide rods (not shown) being disposed towards the opposite end of the body 10. The guide rods 157 to 161 are fixed in position by means of a clamping strip 162 secured to the edge of the baffle 135 by four bolts 163. These guide rods constitute, effectively, an extension of the baffle 135 and, when seen in a direction parallel to the axis of rotation of the body 10 (FIGURE 18) they are slightly curved downwardly. The arrangement is such that the downward curvature of the end guides 157 and 161 is greater than that of the central guide 159. In plan view (FIGURE 17) the guide rods extend perpendicular to the axis of rotation of the body 10. If desired, the extent of the baffle 135 may be less than that illustrated in the drawings while the guide rods 157 to 161 may be correspondingly longer. Such guide rods may advantageously be employed even when the groups of guides 136, 140 and 141 are removed to permit operation of the tedder in a conventional manner.

During operation of the tedder, the body 10 rotates in the direction indicated by the arrow V in FIGURE 18 and the crop or like material is moved forwardly relative to the direction of travel of the tedder and is guided upwardly and rearwardly over the body 10 by the baffle 135. The guide rods 157 to 161 prevent the crop or like material from moving out of the range of the groups 136, 140 and 141 of guides which latter separate the crop or the like into two relatively spaced parts which are deposited upon the ground in two similarly spaced swaths. The wedge-shaped dividing member afforded by the two plates 154 and 155 is very effective in promoting the separation of the crop or the like into the two said parts. As in the previous embodiments, the width of the swath which is deposited is dependent principally upon the distance between the free ends of the closest guides of two different groups such as, for example, the guides 137 and 142 of the groups 136 and 140 which can be seen in FIGURE 17. In this embodiment, this width is very slightly less than one quarter of the width of the body 10. It will be apparent that, by use of any one of the tedders which have been described, tedder crop or like material can be deposited upon the group in two diffuse swaths which extend in the direction of travel of the tedder. Alternatively, if it is desired that the tedder should operate in the conventional manner in which the crop is deposited over a strip of land whose width is substantially equal to the width of the rotatable body 10, this can be readily achieved merely by removing the various guide members associated with the baffles of the tedders.

What we claim is:

1. A haymaking machine for tedding hay and similar crop, said haymaking machine being provided with a frame movable over the ground and a tined body journaled in the frame so as to be rotatable about a substantially horizontal axis, driving means, said driving means driving the tined body in a direction whereby during operation the tines in the lowermost region of the body move forwardly relative to the direction of travel of the tedder, first guide means extending along the length of the tined body and being arranged in front of the body and rearwardly over the tined body relative to the direction of travel of the machine, second guide means attached to the tedder near the ends of the tined body, said second guide means including bent resilient rods, said resilient rods defining a deflector surface which is oblique to the vertical, said rods being positioned one above the other adjacent the tedder with the lower rods being bent towards said tined body at sharper angles than the upper rods.

2. The haymaking machine as claimed in claim 1 wherein the rods are made of spring steel.

3. The haymaking machine as claimed in claim 1 wherein the first guide means is a hood-shaped baffle.

4. The haymaking machine as claimed in claim 3 wherein the baffle is positioned in front of the tined body, said baffle being curved upwardly and extending rearwardly.

5. The haymaking machine as claimed in claim 1 wherein, viewed from the side, the lower rods extend at a greater distance behind the tedder than the upper rods.

6. A haymaking machine for tedding hay and similar crop, said haymaking machine being provided with a frame movable over the ground and a tined body journaled in the frame so as to be rotatable about a substantially horizontal axis, driving means, said driving means driving the tined body in a direction whereby during operation the tines in the lowermost region of the body move forwardly relative to the direction of travel of the tedder, a first guide means extending along the length of the tined body and being arranged to guide the crop between said first guide means and the tined body upwardly in front of the body and rearwardly over the tined body relative to the direction of travel of the machine, second guide means attached to the tedder and extending beyond the first guide means and extending upwardly and above the center of the tined body to divide such crop into at least two parts subsequently to be deposited on the ground in the form of a similar number of relatively spaced swathes.

7. A haymaking machine for tedding hay and similar crop, said haymaking machine being provided with a frame movable over the ground and a tined body journaled in the frame so as to be rotatable about a substantially horizontal axis, driving means, said driving means driving the tined body in a direction whereby during operation the tines in the lowermost region of the body move forwardly relative to the direction of travel of the tedder, a first guide means extending along the length of the tined body and being arranged to guide the crop between said first means and the tined body upwardly in front of the body and rearwardly of the tined body relative to the direction of travel of the machine, second guide means attached to the tedder and extending beyond the first guide means and extending above the center of the tined body to divide such crop into at least two parts subsequently to be deposited on the ground in the form of a similar number of relatively spaced swathes.

8. A haymaking machine for tedding hay and similar crop, said haymaking machine being provided with a frame movable over the ground and a tined body journaled in the frame so as to be rotatable about a substantially horizontal axis, driving means, said driving means driving the tined body in a direction whereby during operation the tines in the lowermost region of the body move forwardly relative to the direction of travel of the tedder, guide means, said guide means extending along the length of the tined body and being arranged to guide the crop between said first guide means and the tined body upwardly in front of the body and rearwardly over the tined body relative to the direction of travel of the machine, second guide means being provided to divide such crop into at least two parts subsequently to be deposited on the ground in the form of a similar number of relatively spaced swaths, said second guide means including elements positioned adjacent each end of the tined body, said elements extending beyond the first guide means and enclosing an acute angle with the axis of rotation of the tined body.

9. The invention of claim 8 wherein said elements comprise a plurality of deflectable rods arranged near the tined body in a substantially vertical plane.

10. A haymaking machine for tedding hay and similar crop, said haymaking machine being provided with a frame movable over the ground and a tined body journaled in the frame so as to be rotatable about a substantially horizontal axis, driving means, said driving means driving the tined body in a direction whereby during operation the tines in the lowermost region of the body move forwardly relative to the direction of travel of the tedder, a first guide means extending along the length of the tined body and being arranged to guide the crop between the first guide means and the tined body upwardly in front of the body and rearwardly over the tined body relative to the direction of travel of the machine, second guide means attached to and extending beyond the first guide means and extending upwardly and above the center of the tined body to divide such crop into at least two parts subsequently to be deposited on the ground in the form of a similar number of relatively spaced swaths.

11. The invention of claim 10 wherein the second guide means is comprised of a plurality of deflectable rods disposed above the tined body.

12. The invention of claim 11 wherein the rods are positioned adjacent each end of the tined body, the rods at each end being arranged in a substantially vertical plane.

13. The invention of claim 11 wherein the rods extend substantially parallel to one another in plan view.

14. The invention of claim 10 wherein the first guide means is a hood-shaped baffle.

15. The invention of claim 14 wherein the baffle is positioned in front of the tined body, said baffle being curved upwardly and extending rearwardly.

16. The invention of claim 10 wherein the second guide means is comprised of a plurality of deflectable rods, each of said rods including substantially horizontal portions extending from said second guide means.

17. The invention of claim 16 wherein the second guide means includes a group of rods positioned adjacent each end of the tined body, said rods having portions that extend perpendicular to the axis of rotation of the tined body, each group of rods having bent portions and the bent portions of each group being inclined towards the other group.

18. The invention of claim 16 wherein the second guide means includes two groups of rods adjacent the center of the tined body, said rods having bent portions and the bent portions of each group being inclined away from the other group.

19. The invention of claim 16 wherein the guide rods are formed in integral pairs and the integral connecting portion between two guide rods connects said rods to the first guide means.

20. The invention of claim 16 wherein the rods are connected to one another by supporting means spaced apart from the first guide means.

21. The invention of claim 20 wherein the supporting means is located adjacent the axis of rotation of the tined body.

22. The invention of claim 21 wherein the supporting means is comprised of a vertically disposed bar provided with laterally extending holes for supporting the rods.

23. The invention of claim 22 wherein the bar includes holes on one side for receiving a plurality of substantially parallel rods and the other side of said bar includes additional holes for supporting diverging rods.

24. The invention of claim 20 wherein the supporting means is an elongated pin and the rods have loops encircling the pin.

25. The invention of claim 24 wherein the pin has spacers which separate the rods.

26. The invention of claim 24 wherein the loops are located on the sides of the rods remote from the crop-engaging sides of the rods.

References Cited by the Examiner

UNITED STATES PATENTS

| | | | |
|---|---|---|---|
| 1,170,616 | 2/1916 | Dintaman | 56—189 X |
| 2,502,599 | 4/1940 | Smart | 56—370 |
| 2,575,466 | 11/1951 | Paul | 180—14 |
| 2,815,636 | 12/1957 | Reilly | 56—370 |
| 2,862,568 | 12/1958 | Koch | 180—14 |
| 3,059,403 | 10/1962 | Bamford et al. | 56—372 X |

FOREIGN PATENTS 86,403   10/1958   Denmark.

ABRAHAM G. STONE, *Primary Examiner.*

RUSSELL R. KINSEY, *Examiner.*